No. 733,737. PATENTED JULY 14, 1903.
H. J. NOYES.
PIPE DAMPER.
APPLICATION FILED JULY 20, 1901.
NO MODEL.
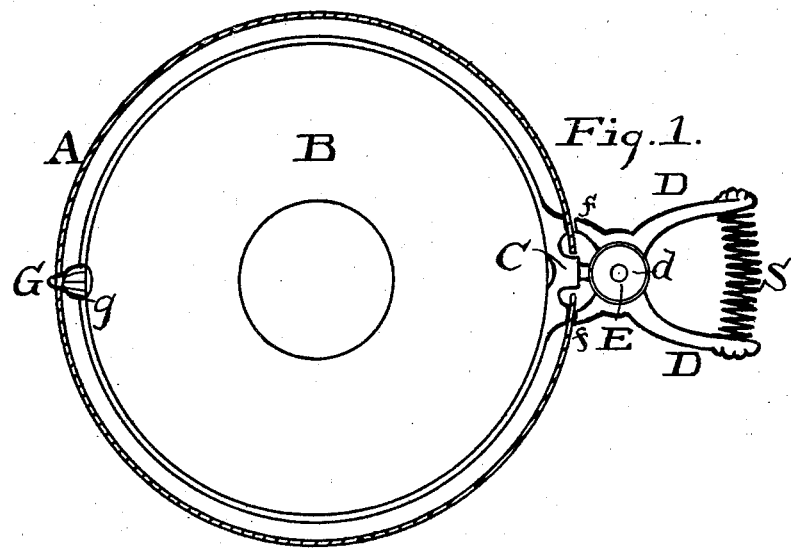
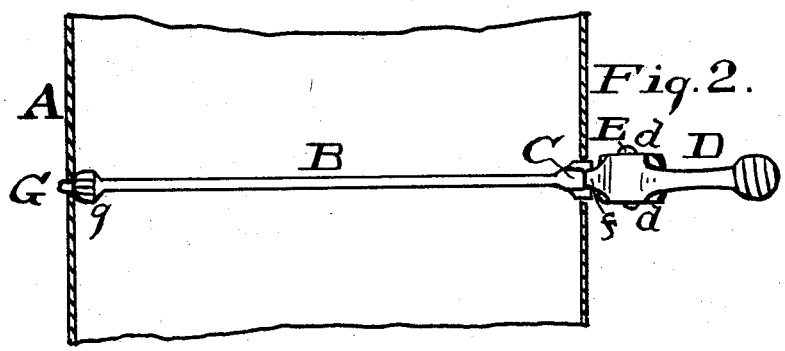
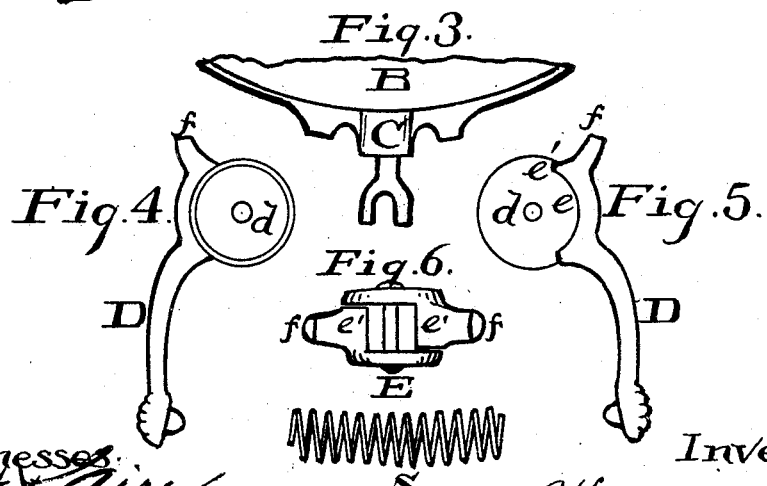
Witnesses
Inventor:
Horatio J. Noyes.
per Geo. W. Tibbitts
Attorney.

No. 733,737. Patented July 14, 1903.

UNITED STATES PATENT OFFICE.

HORATIO J. NOYES, OF ASHTABULA, OHIO.

PIPE-DAMPER.

SPECIFICATION forming part of Letters Patent No. 733,737, dated July 14, 1903.

Application filed July 20, 1901. Serial No. 69,073. (No model.)

*To all whom it may concern:*

Be it known that I, HORATIO J. NOYES, a citizen of the United States of America, and a resident of Ashtabula, county of Ashtabula, State of Ohio, have invented certain new and useful Improvements in Pipe-Dampers, of which the following is a specification.

This invention relates to dampers for smoke, air, and similar pipes; and it consists in the new construction and attachment of a friction-handle and other features of improvements, substantially as hereinafter described, and pointed out in the claims.

The objects of and working of this improvement will fully appear in the following description, when considered in connection with the accompanying drawings, in which—

Figure 1 is a face or plan view of the damper as seen attached to a pipe. Fig. 2 is a sectional view of the pipe, showing an edge view of the damper mounted therein. Fig. 3 is a portion of the damper, showing the journal to which the handle is attached. Figs. 4 and 5 are detached views of the gripping-levers forming the handle, showing, respectively, the outside and inside faces of their disks. Fig. 6 is an end view of the handle, showing the gripping-jaws.

A represents a portion of pipe.

B is a damper-disk provided on one side with a journal C, adapted for the attachment of the handle, and on the opposite side with a pointed journal G. The journal C has a bifurcated end instead of a hole through it.

D D are two levers, each having a disk $d\ d$. On the inside faces of the disks are provided segmental flanges $e$, so that when the two are put together there will be formed a chamber within the disks for the reception of the journal C. The two disks are permanently joined together by a rivet E. The flanges, at $e$, form the jaws, which grip the handle onto the neck of the journal. S is a spring placed between the ends of the levers to spread and hold their ends apart.

The pointed journal G has a tapered sharpened corrugated enlargement $g$, for a use hereinafter shown.

The method of attaching this damper and handle to the pipe is as follows: First take the damper in hand and use the point G for punching a hole in one side of the pipe, using the corrugated enlargement $g$ for reaming out the hole large enough to receive the journal C. Now insert the journal C in said hole from the inside of the pipe and bring the point G to a spot in the pipe opposite to said hole by compressing the pipe sufficiently to place the damper square across in the pipe. Then force the point G through the side of the pipe to the shoulder of its enlargement $g$. Now the damper is in place for use. To attach the handle, remove the spring from between the ends of the levers. Now press the ends of the levers together. This will let the end of the journal C pass in between the jaws of the flanges $e\ e$ on the disks $d\ d$. The rivet E will at the same time pass into the fork of said journal. Now by pressing the ends of the levers apart the jaws $e'\ e'$ will grip onto the neck of the journal and by again inserting the spring in between the ends of the levers the handle will be fastened on the points $f\ f$ of the levers bearing on the outside of pipe A. To remove the handle, the spring is again removed, the levers pressed together, releasing their grip on the journal, and withdrawing the handle therefrom.

Having described my invention, what I claim is—

1. In pipe-dampers, a handle consisting of levers D D, disks $d\ d$ on said levers having segmental flanges $e\ e$, and joined by a rivet E, a spring S between the ends of said levers; in combination with damper-disk B having bifurcated journal C, substantially as described.

2. In pipe-dampers, a handle comprising levers D D, disks $d\ d$ on said levers having segmental flanges $e\ e$ and joined by rivet E, and the spring S between the ends of said levers, in combination with damper-disk B having the bifurcated journal C and the pointed journal G having the corrugated enlargement $g$, substantially as and for the purpose set forth.

Signed by me at Cleveland, Ohio, this 16th day of July, 1901.

HORATIO J. NOYES.

Witnesses:
J. A. FENNER,
GEO. W. TIBBITTS.